US009135006B1

(12) United States Patent
Sha et al.

(10) Patent No.: US 9,135,006 B1
(45) Date of Patent: *Sep. 15, 2015

(54) EARLY EXECUTION OF CONDITIONAL BRANCH INSTRUCTION WITH PC OPERAND AT WHICH POINT TARGET IS FETCHED

(75) Inventors: Li Sha, San Jose, CA (US); Ching-Han Tsai, San Jose, CA (US); Chi-Kuang Chen, Santa Clara, CA (US); Tzun-Wei Lee, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,958

(22) Filed: Sep. 5, 2012

Related U.S. Application Data

(63) Continuation of application No. 12/504,080, filed on Jul. 16, 2009, now Pat. No. 8,275,978.

(60) Provisional application No. 61/085,718, filed on Aug. 1, 2008, provisional application No. 61/084,337, filed on Jul. 29, 2008.

(51) Int. Cl.
  *G06F 9/32* (2006.01)
  *G06F 9/30* (2006.01)
(52) U.S. Cl.
  CPC ............ *G06F 9/30058* (2013.01); *G06F 9/322* (2013.01); *G06F 9/324* (2013.01)
(58) Field of Classification Search
  CPC ................ G06F 9/3005–9/30058; G06F 7/76; G06F 7/766
  USPC .............. 712/234, 233, 205, E9.075, E9.076, 712/E9.077
  See application file for complete search history.

(56) References Cited

U.S. PATENT DOCUMENTS

| | | | |
|---|---|---|---|
| 4,525,776 A * | 6/1985 | Eldumiati et al. | 712/221 |
| 5,070,451 A | 12/1991 | Moore et al. | |
| 5,440,749 A | 8/1995 | Moore et al. | |
| 5,687,336 A | 11/1997 | Shen et al. | |
| 5,765,037 A * | 6/1998 | Morrison et al. | 713/502 |
| 5,774,709 A * | 6/1998 | Worrell | 712/233 |
| 5,784,603 A | 7/1998 | Leung et al. | |
| 5,790,845 A | 8/1998 | Shimada et al. | |
| 5,809,294 A | 9/1998 | Ando | |
| 5,964,868 A | 10/1999 | Gochman et al. | |
| 6,243,805 B1 * | 6/2001 | Mahurin | 712/233 |
| 6,308,253 B1 * | 10/2001 | Gadre et al. | 712/41 |
| 6,535,899 B1 * | 3/2003 | Kuromaru et al. | 708/209 |
| 6,560,696 B1 | 5/2003 | Hummel et al. | |
| 6,622,240 B1 | 9/2003 | Olson et al. | |
| 6,865,666 B2 * | 3/2005 | Yoshida et al. | 712/234 |
| 7,174,014 B2 * | 2/2007 | Lee et al. | 380/28 |
| 7,620,803 B2 * | 11/2009 | Kudo | 712/233 |
| 7,685,408 B2 * | 3/2010 | Wolff et al. | 712/224 |
| 8,074,061 B2 * | 12/2011 | Kaplan | 712/245 |
| 2010/0050164 A1 * | 2/2010 | Van De Waerdt et al. | 717/159 |

* cited by examiner

*Primary Examiner* — Kenneth Kim

(57) ABSTRACT

In accordance with the teachings described herein, systems and methods are provided for advanced execution of branch instructions in a microprocessor pipeline. In one embodiment, a branch instruction of an assembly language program code is executed that includes (i) a condition operand, (ii) a branch destination operand, and (iii) a program count operand. It is determined whether a current program count matches a stored program count operand. After determining that a condition was met when the branch instruction was executed, and in response to determining that the current program count matches the stored program count operand, a destination instruction specified by the stored branch destination operand is fetched.

20 Claims, 6 Drawing Sheets

| Time | Line Being Fetched | Fetch | → | Decode | → | Execute |
|---|---|---|---|---|---|---|
| 0 | - | [ ] | | [ ] | | [ ] |
| 1 | 1 | COMPARE R1, R2 | | [ ] | | [ ] |
| 2 | 2 | BRANCH 999, LT, 5 | | COMPARE R1, R2 | | [ ] |
| 3 | 3 | ADD R3, 1 | | BRANCH 999, LT, 5 | | COMPARE R1, R2 |
| 4 | 4 | ADD R5, 2 | | ADD R3, 1 | | BRANCH 999, LT, 5 |
| 5 | 999 | SUB R1, R2 | | ADD R5, 2 | | ADD R3, 1 |
| 6 | 1000 | SUB R3, R1 | | SUB R1, R2 | | ADD R5, 2 |
| 7 | 1001 | SUB R5, R1 | | SUB R3, R1 | | SUB R1, R2 |
| . . . | . . . | . . . | | . . . | | . . . |

(branch taken)

| Line | Instruction |
|------|-------------|
| 1 | ADD R3, 1 |
| 2 | ADD R5, 2 |
| 3 | COMPARE R1, R2 |
| 4 | BRANCH 999, LT |
| 5 | ADD R1, R2 |
| 6 | ADD R1, 1 |
| 7 | ADD R2, 1 |
| ... | ... |
| ... | ... |
| 999 | SUB R1, R2 |
| 1000 | SUB R3, R1 |
| 1001 | SUB R5, R1 |
| ... | ... |

FIG. 1A

| Time | Line Being Fetched | Fetch | Decode | Execute |
|------|--------------------|-------|--------|---------|
| 0 | - | [ ] | [ ] | [ ] |
| 1 | 1 | ADD R3, 1 | [ ] | [ ] |
| 2 | 2 | ADD R5, 2 | ADD R3, 1 | [ ] |
| 3 | 3 | COMPARE R1, R2 | ADD R5, 2 | ADD R3, 1 |
| 4 | 4 | BRANCH 999, LT | COMPARE R1, R2 | ADD R5, 2 |
| 5 | 5 | ADD R1, R2 | BRANCH 999, LT | COMPARE R1, R2 |
| 6 | 6 | ADD R1, 1 | ADD R1, R2 | BRANCH 999, LT |
| 7 | 7 | ADD R2, 1 | ADD R1, 1 | ADD R1, R2 |
| ... | ... | ... | ... | ... |

FIG. 1B
(branch not taken)

| Time | Line Being Fetched | Fetch | Decode | Execute |
|------|--------------------|-------|--------|---------|
| 0 | - | [ ] | [ ] | [ ] |
| 1 | 1 | ADD R3, 1 | [ ] | [ ] |
| 2 | 2 | ADD R5, 2 | ADD R3, 1 | [ ] |
| 3 | 3 | COMPARE R1, R2 | ADD R5, 2 | ADD R3, 1 |
| 4 | 4 | BRANCH 999, LT | COMPARE R1, R2 | ADD R5, 2 |
| 5 | 5 | ADD R1, R2 | BRANCH 999, LT | COMPARE R1, R2 |
| 6 | 6 | ADD R1, 1 | ADD R1, R2 | BRANCH 999, LT |
| 7 | - | [ ] | [ ] | [ ] |
| 8 | 999 | SUB R1, R2 | [ ] | [ ] |
| 9 | 1000 | SUB R3, R1 | SUB R1, R2 | [ ] |
| 10 | 1001 | SUB R5, R1 | SUB R3, R1 | SUB R1, R2 |
| ... | ... | ... | ... | ... |

FIG. 1C
(branch taken)

| Line | Instruction |
|---|---|
| 1 | COMPARE R1, R2 |
| 2 | BRANCH 999, LT, 5 |
| 3 | ADD R3, 1 |
| 4 | ADD R5, 2 |
| 5 | ADD R1, R2 |
| 6 | ADD R1, 1 |
| 7 | ADD R2, 1 |
| ... | ... |
| ... | ... |
| 999 | SUB R1, R2 |
| 1000 | SUB R3, R1 |
| 1001 | SUB R5, R1 |
| ... | ... |

FIG. 3A

| Time | Line Being Fetched | Fetch | Decode | Execute |
|---|---|---|---|---|
| 0 | – | [ ] | [ ] | [ ] |
| 1 | 1 | COMPARE R1, R2 | [ ] | [ ] |
| 2 | 2 | BRANCH 999, LT, 5 | COMPARE R1, R2 | [ ] |
| 3 | 3 | ADD R3, 1 | BRANCH 999, LT, 5 | COMPARE R1, R2 |
| 4 | 4 | ADD R5, 2 | ADD R3, 1 | BRANCH 999, LT, 5 |
| 5 | 5 | ADD R1, R2 | ADD R5, 2 | ADD R3, 1 |
| 6 | 6 | ADD R1, 1 | ADD R1, R2 | ADD R5, 2 |
| 7 | 7 | ADD R2, 1 | ADD R1, 1 | ADD R1, R2 |
| ... | ... | ... | ... | ... |

FIG. 3B
(branch not taken)

| Time | Line Being Fetched | Fetch | Decode | Execute |
|------|--------------------|-------|--------|---------|
| 0 | -- | [ ] | [ ] | [ ] |
| 1 | 1 | COMPARE R1, R2 | [ ] | [ ] |
| 2 | 2 | BRANCH 999, LT, 5 | COMPARE R1, R2 | [ ] |
| 3 | 3 | ADD R3, 1 | BRANCH 999, LT, 5 | COMPARE R1, R2 |
| 4 | 4 | ADD R5, 2 | ADD R3, 1 | BRANCH 999, LT, 5 |
| 5 | 999 | SUB R1, R2 | ADD R5, 2 | ADD R3, 1 |
| 6 | 1000 | SUB R3, R1 | SUB R1, R2 | ADD R5, 2 |
| 7 | 1001 | SUB R5, R1 | SUB R3, R1 | SUB R1, R2 |
| . . . | . . . | . . . | . . . | . . . |

(branch taken)

EARLY EXECUTION OF CONDITIONAL BRANCH INSTRUCTION WITH PC OPERAND AT WHICH POINT TARGET IS FETCHED

CROSS REFERENCE TO RELATED APPLICATIONS

This application is a continuation of U.S. patent application Ser. No. 12/504,080, entitled "Execution of Conditional Branch Instruction Specifying Branch Point Operand to Be Stored in Jump Stack with Branch Destination for Jumping to upon Matching Program Counter Value," filed Jul. 16, 2009, which claims priority to U.S. Provisional Application No. 61/085,718, entitled "FIGO Pre-Jump Architecture," filed Aug. 1, 2008, and to U.S. Provisional Application No. 61/084,337, entitled "Flexible Bit Permutation Instruction Extension for Embedded Processors," filed Jul. 29, 2008, the contents of each of which are incorporated herein by reference in their entirety.

BACKGROUND

The present invention relates to microprocessors, and in particular, to pipelining branch instructions. An embodiment of the present invention also relates to bit permutation.

Unless otherwise indicated herein, the approaches described in this section are not prior art to the claims in this application and are not admitted to be prior art by inclusion in this section.

Many microprocessors include a pipeline that has a number of stages. Instructions enter into the pipeline and move through the stages. This pipelining works well for sequential programs. When a branch instruction is executed, other sequential instructions have already been entered into the pipeline. If the branch is not taken, this is fine, as the sequential instructions may continue to be executed sequentially. However, if the branch is taken, the sequential instructions need to be flushed from the pipeline and the non-sequential instruction needs to be entered into the pipeline. Flushing the pipeline has at least two drawbacks: the time spent in re-filling the pipeline, and the additional circuitry needed to control the flushing operation.

FIGS. 1A-1C illustrate the operation of a prior art pipeline. FIG. 1A shows an example assembly language program. FIG. 1B illustrates the operation of the pipeline on the program of FIG. 1A when the branch is not taken. FIG. 1C illustrates the operation of the pipeline on the program of FIG. 1A when the branch is taken.

FIG. 1A shows line numbers and corresponding instructions. (The line numbers are an abstraction; each instruction is stored in a memory location, and the line number serves as a proxy for the memory location.) In line 1, the instruction adds the value 1 to R3. In line 2, the instruction adds the value 2 to R5. In line 3, the instruction compares the values in registers R1 and R2. When the compare instruction is executed, various results or flags are set in the microprocessor in accordance with the comparison being evaluated. In line 4, a branch to line 999 is executed if the result of the comparison is "less than" (LT). More specifically, if R1 is less than R2, the branch is to be taken; if not, the program is to proceed normally (by continuing to execute the sequential instructions in the pipeline). Lines 5-7 perform addition on various registers. (The lines between 7 and 999 are irrelevant for purposes of the present discussion.) Lines 999-1001 perform subtraction on various registers. (The lines after 1001 are irrelevant for purposes of the present discussion.)

FIG. 1B shows how a three stage pipeline would process the program of FIG. 1A. The three stages are fetch, decode and execute. Instructions move through the pipeline from left to right. At time 0, the pipeline is empty. At time 1, the instruction in line 1 (ADD R3, 1) is fetched. At time 2, the instruction in line 2 (ADD R5, 2) is fetched, and "ADD R3, 1" is moved to the decode stage for decoding. At time 3, COMPARE is fetched, "ADD R5, 2" is decoded, and "ADD R3, 1" is executed. At time 4, BRANCH is fetched, COMPARE is decoded, and "ADD R5, 2" is executed. At time 5, "ADD R1, R2" is fetched, BRANCH is decoded, and COMPARE is executed. As a result of the comparison, various flags are set in the microprocessor.

At time 6, "ADD R1, 1" is fetched, "ADD R1, R2" is decoded, and BRANCH is executed. The branch instruction looks at the flags to see if its condition is true as a result of the comparison. Since the condition is "less than", the branch will be taken if R1 is less than R2. In other words, the branch will not be taken if R1 is not less than R2. So if R1 is 2 and R2 is 1, the branch to 999 will not be taken. We will assume that the branch is not taken for FIG. 1B.

At time 7, since the branch is not taken, the program of FIG. 1A continues with line 7; "ADD R2, 1" is fetched, "ADD R1, 1" is decoded, and "ADD R1, R2" is executed. The program then continues. As can be seen, once the pipeline is going, it fills and executes one instruction per unit of time.

FIG. 1C shows how the three stage pipeline would operate when the branch is taken. At times 0-6, the flow is the same as FIG. 1B. However, assume that the comparison results in TRUE (e.g., R1 is 1 and R2 is 2, so now R1 is less than R2). Thus at time 6, when BRANCH is executed, the branch to line 999 occurs.

At time 7, since line 999 is not ready and it is not proper to act on "ADD R1, R2" or "ADD R1, 1", the pipeline is flushed. Flushing removes the previously pipelined instructions ("ADD R1, R2" and "ADD R1, 1") from the pipeline.

At time 8, the instruction at line 999 (SUB R1, R2) is fetched. As a result of the flushing, there is nothing to decode or execute.

At time 9, "SUB R3, R1" is fetched, and "SUB R1, R2" is decoded. As a result of the flushing, there is still nothing to execute.

At time 10, "SUB R5, R1" is fetched, "SUB R3, R1" is decoded, and "SUB R1, R2" is executed. The program then continues. Note that as a result of the branch, there are three lost execution cycles. In addition, circuitry is needed to control the flushing operation.

Furthermore, embedded software applications often require frequent bit manipulation operations for setting or reading hardware register bitfields and composing messages. For processors using the typical instruction set architecture (ISA), these bit manipulation operations can take multiple instructions to accomplish, thereby reducing the efficiency of the applications.

Thus, there is a need for improved microprocessors.

SUMMARY

Embodiments of the present invention improve the operation of a pipeline in a microprocessor. In one embodiment the present invention includes an apparatus with a microprocessor that has a pipeline circuit, a branch circuit, and a control circuit. The pipeline circuit pipelines instructions for the microprocessor. The branch circuit is coupled to the pipeline circuit and operates to store branch information. The control circuit is coupled to the pipeline circuit and the branch circuit. The control circuit stores a first branch information from the pipeline circuit to the branch circuit when a first condition is met. The control circuit retrieves a second branch information from the branch stack circuit to the pipeline circuit when a second condition is met. In this manner, the need for dedicated pipeline flush circuitry is avoided.

The branch information may include a branch position and a jump destination.

The instructions may include a branch instruction. The branch instruction may include a jump destination. The first branch information may include a branch position and the jump destination. The branch position may be related to the branch instruction.

The first branch information may correspond to a push operation related to the branch instruction. The second branch information may corresponds to a pop operation related to the branch instruction.

The pipeline circuit may include a first stage and additional stages following the first stage. The control circuit may push the first branch information from one of the additional stages to the branch stack circuit. The control circuit may pop the second branch information from the branch stack circuit to the first stage.

The branch instruction may include a condition selection. The first condition may be met when the condition selection is met.

The second condition may be met when a program count value matches the branch position.

The apparatus may further include a program counter circuit that is coupled to the branch circuit. The program counter circuit may store a program count value. The control circuit may pop the second branch information from the branch circuit when the program count value matches the branch position.

The apparatus may further include a memory circuit that stores the instructions. The control circuit may control the program counter circuit to store the jump destination as a new program count value. The control circuit may access the memory circuit using the new program count value, may read a new instruction, and may provide the new instruction to the pipeline circuit.

The control circuit may be configured to insert a bubble when a quantity of unrelated instructions following a branch instruction is less than a quantity of stages in the pipeline circuit between a first stage and an execution stage, plus one.

The branch circuit may include a branch stack circuit that operates as a stack.

According to an embodiment, a method of operating a microprocessor includes the following. First, a memory is provided. The memory is configured to store branch information. Second, instructions for the microprocessor are pipelined. Third, first branch information is stored from the pipeline to the memory when a first condition is met. Fourth, second branch information is retrieved from the memory to the pipeline when a second condition is met.

According to an embodiment, a system includes an ALU and registers in addition to the microprocessor described above.

The following detailed description and accompanying drawings provide a better understanding of the nature and advantages of the present invention.

BRIEF DESCRIPTION OF THE DRAWINGS

FIGS. 1A-1C illustrate the operation of a prior art pipeline.

FIGS. 3A-3C illustrate the operation of the microprocessor (see FIG. 2) according to an embodiment of the present invention.

FIG. 4 is a block diagram of a pipeline circuit (see FIG. 2) according to an embodiment of the present invention having three stages.

DETAILED DESCRIPTION

Described herein are techniques for branching in a pipelined microprocessor. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various method and processes are described below. That they are described in a certain order is mainly for ease of presentation. It is to be understood that particular steps may be performed in other orders or in parallel as desired according to various implementations. When a particular step must precede or follow another, such will be pointed out specifically (e.g., "step X must follow step Y") when not evident from the context.

Embodiments of the present invention include two aspects. The first aspect includes a branch stack. The second aspect is directed toward bit permutation. These aspects are discussed below.

Aspect 1: Branch Stack

In general, the branch stack is a pre jump architecture that implements a branching mechanism for CPUs or microcontrollers. With this pre jump architecture, there is no longer a need for branch/jump prediction and pipeline flush logic, which allows the reduction of the area and complexity of the design.

As more fully detailed below, this architecture/instruction specifies a branch position, a jump destination, and a condition selection. If the condition is met, the branch position and destination pair are pushed onto the top of a branch stack. When the program counter matches the branch position of the entry at the top of the stack, a branch is be triggered. The next program counter value is taken from the jump destination stack entry, and the entry is popped from the stack. The result of the condition selection is known before the pre jump instruction, so that it is known beforehand whether the jump will be taken.

This operation may be contrasted with conventional operation as discussed in the background. As discussed above, the conventional branching mechanism requires the CPU pipeline to make a branch prediction every time there is a branch instruction. If the prediction turns out to be wrong, the pipeline needs to be flushed, and resumed at the opposite location of the branch. With the pre jump mechanism according to an embodiment of the present invention, such logic is not needed.

Figure 2:
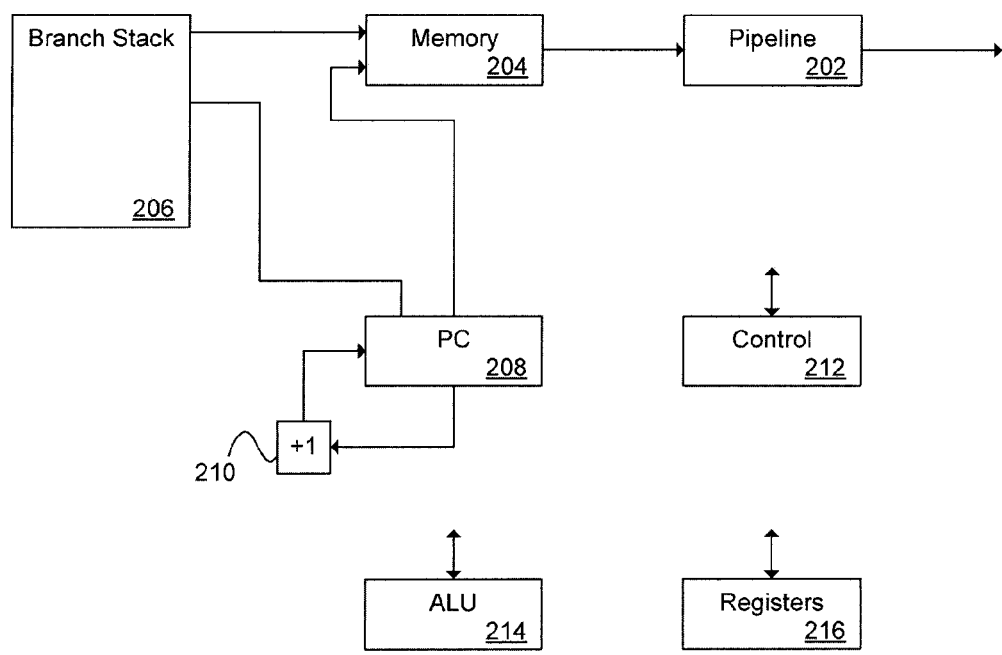
FIG. 2 is a block diagram of a microprocessor according to an embodiment of the present invention.

FIG. 2 is a block diagram of a microprocessor 200 according to an embodiment of the present invention. The microprocessor 200 includes a pipeline circuit 202, a memory circuit 204, a branch stack circuit 206, a program counter (PC) circuit 208, an incrementer circuit 210, a control circuit 212, an arithmetic and logic unit (ALU) circuit 214, and register circuits 216. The microprocessor 200 may include or be associated with other components (not shown), a description of which is omitted for brevity, as being unrelated to an embodiment of the present invention. For example, the microprocessor 200 may be associated with a memory that provides data for operation by the microprocessor 200. In addition, all the connections between the components of FIG. 2 are not shown; assume that the connections are such that the components can exchange information as described in the text.

The pipeline circuit 202 pipelines instructions for execution by the microprocessor 200. The pipeline circuit 202 may have a number of stages. Examples of a three stage pipeline and a six stage pipeline are provided in subsequent paragraphs.

The memory circuit 204 stores the instructions for execution by the microprocessor 200. The instructions may correspond to a computer program similar to that of FIG. 1A. The memory circuit 204 may be configured as an instruction tightly coupled memory (ITCM). The memory circuit 204 may be implemented as a static random access memory (SRAM).

The branch stack circuit 206 implements a stack that stores branch information. The branch stack circuit 206 may be a memory circuit such as a register circuit that is configured to operate as a stack.

The branch information stored by the branch stack circuit 206 relates to branch instructions executed by the microprocessor 200. According to an embodiment, each branch information includes a branch location and a jump destination. The jump destination is the location (in the memory circuit 204) that contains the target of the branch instruction (for example, in FIG. 1A, location 999 is the target of the branch instruction in line 2). The branch location is described in subsequent paragraphs.

The PC 208 stores the program count value. The program count value points to the location (in the memory circuit 204) that contains the instruction to be put into the pipeline circuit 202. For example using the program of FIG. 1A, when the program count value is 3, the instruction in line 3 (ADD R1) is to be put into the fetch stage of the pipeline (see FIG. 1B). The incrementer 210 adds 1 to the program count value, which is useful when the program is executing sequentially.

The control circuit 212 controls the operation of the microprocessor 200. Full details of the control circuit 212 as it relates to an embodiment of the present invention are provided in subsequent paragraphs.

The ALU 214 performs arithmetic and logic operations for the microprocessor 200, and the register circuits 216 store the inputs and outputs of the ALU 214. For example from FIG. 1A, the ADD instruction in line 3 is executed by the ALU 214 on registers R1 and R2 in the register circuits 216. The ALU 214 may be one or more ALUs with different functions. For example, the ALU 214 may be two ALUs: a 16 bit ALU and a 64 bit ALU.

Figures 3C, 4:
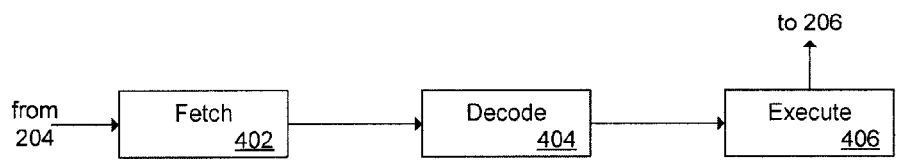

FIGS. 3A-3C illustrate the operation of the microprocessor 200 according to an embodiment of the present invention. FIG. 3A shows an example assembly language program. FIG. 3B illustrates the operation of the microprocessor 200 on the program of FIG. 3A when the branch is not taken. FIG. 3C illustrates the operation of the microprocessor 200 on the program of FIG. 3A when the branch is taken.

FIG. 3A shows line numbers and corresponding instructions. The program is similar to that of FIG. 1A. One difference is that the branch instruction in line 2 now indicates the "branch location". The branch location is the location in the program in which the branch is to be executed. In this case, the branch is to be executed at line 5. This process will become more clear as a result of further discussion below. According to an embodiment, the branch location is relative to the current program count.

According to an embodiment, the programmer (not the compiler) re-orders the assembly code to move the branch instruction up. According to an embodiment, the compiler detects that moving an instruction does not alter the result of the condition prior to the move, and then automatically moves the branch instruction up. According to an embodiment, to implement a "normal" branch instruction, a branch location of "0" may be used with the branch instruction of FIG. 3A. If any NULL instructions are needed as a result of the branch, these may be inserted by the compiler or by the control circuit 212.

FIG. 3B shows how a three stage pipeline (e.g., the pipeline 202) according to an embodiment of the present invention would process the program of FIG. 3A. The operation of FIG. 3B is similar to that of FIG. 1B, so the description common to both is not repeated. The program may be stored in the memory 204. The program counter 208 provides the instructions to the pipeline 202 from the memory 204 according to the program count value. As in FIG. 1B, the branch is not taken.

FIG. 3C shows how the three stage pipeline (e.g., the pipeline 202) according to an embodiment of the present invention would operate when the branch is taken. At times 0-4, the flow is the same as FIG. 3B. However, assume that the comparison results in TRUE (e.g., R1 is 1 and R2 is 2, so now R1 is less than R2). Thus at time 4, when BRANCH is executed, the branch location (5) and the jump destination (999) are pushed to the branch stack 206. (The control circuit 212 may control the operations of the microprocessor 200 that are not otherwise explicitly described as being controlled by a component.) The branch location and the jump destination may be referred to as the branch information.

At time 5, the program counter 208 checks whether the program count value matches the branch location of the top item in the branch stack 206. (The program counter 208 may perform this check at other cycles; the result was irrelevant at times 0-4 and is irrelevant at times 6-7.) Since the program count (5) matches the branch location (5), the branch information is popped from the branch stack 206. The jump destination (999) is used as the new program count value in the program counter 208. Based on the new program count value (999), the memory 204 provides the instruction at the memory location (999) (which is the "SUB R1, R2" instruction on line 999 of the program) to the pipeline circuit 202. This corresponds to the "SUB R1, R2" instruction being fetched. Also at this time, "ADD R5, 2" is decoded and "ADD R3, 1" is executed.

At time 6, the program continues with line 1000 (SUB R3, R1) being fetched. "SUB R1, R2" is decoded, and "ADD R5, 2" is executed.

At time 7, the program continues with line 1001 (SUB R5, R1) being fetched. "SUB R3, R1" is decoded, and "SUB R1, R2" is executed.

The program then continues. Note that in contrast to FIG. 1C, the pipeline 202 does not require flushing in FIG. 3C. As a result, the microprocessor 200 does not require circuitry to implement a pipeline flush operation. In addition, once the pipeline 202 is filled, the microprocessor 202 executes one instruction per cycle.

According to an embodiment, the microprocessor 200 may insert bubbles into the pipeline circuit 202 when appropriate.

A "bubble" refers to a null instruction (NULL) or no-operation (NO-OP). For example, consider that the program of FIG. 3A has, after the branch instruction in line 2, two instructions (in lines 3-4) that are unrelated to the branch. Thus, the program of FIG. 3A does not require a bubble. In general, to avoid a bubble, the number of unrelated instructions following a branch must equal or exceed the number of stages between the first stage and the execution stage, plus one. So for the three stage pipeline of FIG. 3C (for example), two or more unrelated instructions are required to avoid a bubble.

Now assume a variation where the program of FIG. 3A lacks "ADD R5, 2" (line 4). Instead, line 4 has the NULL instruction. The NULL instruction then proceeds through the pipeline in place of ADD R5. Note that although the microprocessor 200 still executes one instruction per cycle, the NULL instructions essentially do nothing, so the microprocessor 200 is less efficient (as compared to not having to insert a NULL). According to an embodiment, the compiler makes sure there is at least one NULL or unrelated instruction between the branch instruction and the branch location. The control circuit 212 may insert additional NULL instruction as needed. The compiler may insert at least one NULL in the event that the microprocessor 200 knows that the instruction is a branch instruction only once it reaches the decode stage; thus the prior stage (fetch) must be filled with a NULL instruction or an unrelated instruction. The control circuit 212 may then insert additional NULLs until the branch instruction reaches the execution stage.

As discussed above, the branch stack circuit 206 operates as a stack. That is, the most recently pushed branch information is at the top of the stack; immediately below it is the next most recently pushed branch information; and at the bottom of the stack is the oldest branch information. This allows for nested branches (or nested loops). According to an embodiment, the branch stack circuit 206 holds four elements of branch information. According to an embodiment, the branch stack circuit 206 may be implemented as a memory; such may be referred to as a branch circuit.

Note that in the example above, the branch information was immediately popped at time 5. This was because there were exactly two unrelated instructions following the branch instruction. (Note that "two unrelated instructions" is the minimum required to avoid the bubble in the three stage pipeline embodiment discussed above.) In another program in which there are more unrelated instructions than the minimum following the branch instruction, note that the branch information may not be immediately popped.

FIG. 4 is a block diagram of the pipeline circuit 202 according to an embodiment of the present invention having three stages: a fetch stage 402, a decode stage 404, and an execute stage 406. The fetch stage 402 fetches instructions from the memory circuit 204. The decode stage 404 performs decoding of the instruction. The execute stage 406 executes the instruction. In addition, the execute stage 406 pushes the branch information to the branch stack 206 as described above. The operation of FIG. 4 is otherwise corresponds to the operations described above with reference to FIGS. 3B-3C.

Figure 5:
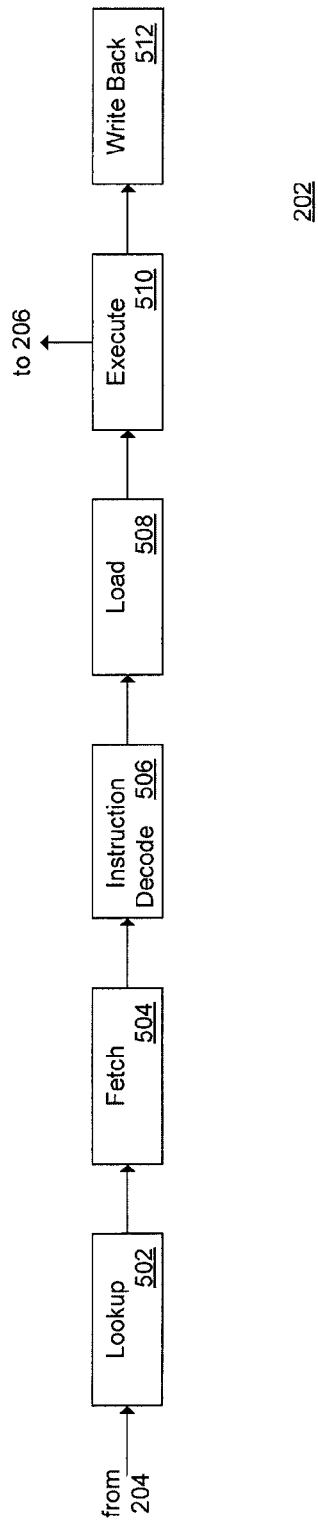
FIG. 5 is a block diagram of a pipeline circuit (see FIG. 2) according to an embodiment of the present invention having six stages.

FIG. 5 is a block diagram of the pipeline circuit 202 according to an embodiment of the present invention having six stages: a lookup stage 502, a fetch stage 504, an instruction decode stage 506, a load stage 508, an execute stage 510, and a write back stage 512. The lookup stage 502 looks up an instruction in the memory 204 according to the program counter value. The fetch stage 504 fetches the instruction from the memory 204. The instruction decode stage 506 decodes the instruction. The load stage 508 loads the information in the instruction into the various components of the microprocessor 200. The execute stage 510 executes the instruction. In addition, the execute stage 510 pushes the branch information to the branch stack 206 as described above. The write back stage 512 writes back the results of the execution to the various components of the microprocessor 200.

Figure 6:
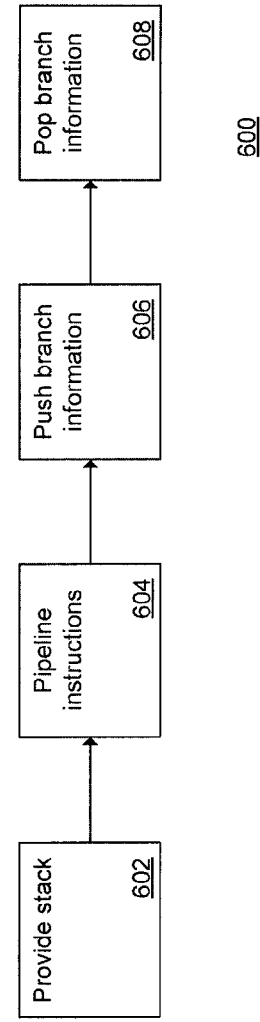
FIG. 6 is a flow diagram of a method of operating a microprocessor (see FIG. 2) according to an embodiment of the present invention.

FIG. 6 is a flow diagram of a method 600 of operating a microprocessor according to an embodiment of the present invention. The method 600 may be performed by the microprocessor 200 (see FIG. 2), for example. In particular, the control circuit 212 may control the operation of the microprocessor 200 to perform the method 600.

In box 602, a memory (e.g., stack) is provided for storing branch information. The memory may be the branch stack 206, for example.

In box 604, instructions for the microprocessor are pipelined in a pipeline. The pipeline may be the pipeline 202, for example.

In box 606, a first branch information is stored (e.g., pushed) from the pipeline to the memory when a first condition is met. As an example, the first condition may correspond to a result of a comparison indicating that a branch is to be taken. The first branch information may include a branch location and a jump destination.

In box 608, a second branch information is retrieved (e.g., popped) from the memory to the pipeline when a second condition is met. The second condition may correspond to a program count value matching a branch location in the branch information. The second branch information may correspond to the first branch information (for example, the branch information at time 4 may be the first branch information, and the same branch information at time 5 may be the second branch information). The second branch information may pass through other components between the stack and the pipeline. For example, in FIG. 2, the branch information includes a jump destination. The program counter 208 uses the jump destination as the address to look up an instruction in the memory 204. The instruction resulting from the lookup is provided to the pipeline circuit 202.

Additional Implementation Details

An embodiment of the present invention may have one or more of the following details in a particular implementation. The instructions may be 24 bit instructions. The system (e.g., the microprocessor 200) may support polling mode. The system may include pre-jump instructions for flow control (see, e.g., the branch instruction in FIG. 3A), working as dynamic programmable delay slots, and no pipeline flush needs to be handled.

The pipeline (e.g., the pipeline 202) may include a 16 bit data pipeline supporting basic operations. A multiply/divide unit (MDU) (also referred to as mac & divider) may be included.

A 64 bit pipeline for a 64 bit ALU may be provided for executing customized hardware instructions. The microprocessor may provide 64 bit access to data RAM and an RF64 (64 entry, 64 bit register file) through the 64 bit pipeline.

The system may be programmed using an assembly compiler and a C-Simulator. The assembly compiler converts assembly code to machine code. The C-Simulator is a cycle accurate (input/output latency not counted) C-model to simulate a program's behavior and performance.

The system may include a 16 bit register file (RF16) (e.g., the registers 216). The RF16 is a 16 bit by 16 register file for the system's 16 bit data path. The RF16 may be implemented as a flop-based RF. The RF16 may be accessed as single register or as quad registers or other access types.

The system may include a 64 bit register file (RF64) (e.g., the registers 216). The RF64 is a 64 bit by 64 register file for the system's 64 bit data path. The RF64 may include a two-port register file (128 bit by 32). The RF64 may be accessed as single 64 bit entry. The system may copy both directions from/to a RF64 entry and a 16 bit by 4 quad register in the RF16. The RF64 may be configured as a 64 bit by 16 flop-based register file. The RF64 may provides a write-only path for the system. The system may use the RF64 to pass context information to the various ALU64 extensions.

The ALU (e.g., the ALU 214) may have a number of flags. Four standard flags include equal (Flag-Z), carry (Flag-C), negative (Flag-N) and signed overflow (Flag-V). Arithmetic operations may update all four flags, while logic operations may update flags Z and N. Additional status flags may be generated from ZCNV: not equal (Zj)=~Z, no carry (Cj)=~C, false (0), true (1), unsigned greater than (G)=~Z & ~C, signed greater than (GS)=~Z & (N==V), unsigned less than (L)=~Z & C, signed less than (LS)=~Z & (N !=V), unsigned not greater than (Gj)=~G, signed not greater than (GSj)=~GS, unsigned not less than (Lj)=~L, and signed not less than (LSj)=~LS.

The system may use a 64 bit data path to access data RAM. The 64 bit data path may support read/write to a 16 bit register in RF16, read/write to a 16 bit by 4 quad register in RF16, read/write to a 64 bit entry in RF64, and memory mapped access to all input/output. Memory and input/output access may be stalled by the SRAM controller or hardware devices. Since read is performed at the load stage, while write is performed at the execute stage, a conflict may happen. When a write operation is followed back to back by a read operation, the read may be stalled and a bubble inserted.

As discussed above, the system uses a pre jump implementation for branching. It specifies a branch position, jump destination, and the condition selection. When the condition is met, this branch position and destination pair are pushed to the top of the branch stack. When the program counter value matches the top of the branch stack, a matched branch is triggered and the branch stack is popped.

In the six stage pipeline of FIG. 5, the branch setup stage is physically 4 stages after the program counter input, indicating at least 3 delay slots (either instructions or bubbles) must be in place. The branch position coded in the instruction must be at least 2 instructions later than the current PC, which means at least 1 delay slot is necessary to appear in the assembly program. If the relative branch position is 2 or 3 (>1, <4), the identify stage will stall and insert 2 or 1 bubbles. These bubbles affect performance no matter if the branch condition is met or not. When the branch stack is sized for four entries, four levels of recursive loops are enabled.

In a six stage pipeline, the program counter (e.g., the program counter 208) may be considered part of the first stage. The program counter may store a 16 bit program counter value. The branch stack may include four entries, with each entry having a 16 bit branch position and a 16 bit jump destination.

In the lookup stage (e.g., the lookup stage 502), when the current PC matches any of the branch positions by stack-mode priority, the associated destination address is used to lookup an instruction in ITCM, and the PC is updated by this destination address+1. Otherwise, the PC is used to lookup an instruction in ITCM, and the PC will be updated by PC+1.

In the fetch stage (e.g., the fetch stage 504), a 24 bit instruction is latched from the ITCM output.

In the identify stage (e.g., the identify stage 506), the following operations are performed. All control bits are decode for all following stages. Information is load from RF16 S-port and optionally the memory read base pointer is updated. The memory read address is calculated. The RF16 write-back address is selected.

In the load stage (e.g., the load stage 508), a memory read is performed if needed, and the operands for the ALU16 and ALU64 are loaded.

In the execute stage (e.g., the execute stage 510), the following operations are performed. A memory write is performed if needed. Operations in the ALU16 and ALU64 are performed. For branch instructions, at the beginning of the stage, the branch position will be compared to current PC, and be used for lookup if there's a match and the condition meets. If no match while the condition meets, this branch case will be pushed to the branch stack.

In the write back stage (e.g., the write back stage 512), write-back of "WB" is performed to the RF16, and write-back of "WB64" is performed to the RF16 or the RF64. (If a 16 bit and a 64 bit datapath write-back to the RF16 have an address conflict, the 64 bit write-back takes precedence over the 16 bit write-back.)

Although embodiments with three and six stages have been shown and described, other numbers of stages may be present in other embodiments.

Aspect 2: Bit Permutation

In an embodiment of the present invention, the ALU64 extension interface is used to implement an efficient bit permutation hardware accelerator as follows. For each bit in the output data word, its source may come from any one bit of the input data, or it can be set to zero or one. The hardware accelerator contains an opcode table that allows a number of bit permutation operations to be preprogrammed in advance, such that during run time the processor can quickly select from the preprogrammed operations for the desired bit permutation result.

As discussed above with reference to FIG. 2, the ALU 214 may include a 64 bit ALU, referred to as the ALU64. The microprocessor 200 implements two powerful instructions for bit manipulations: BFGET and BFSET. BFGET is used to copy a group of continuous bits (of a designated length, from a designated offset) in the source register into the destination register with offset 0. BFSET is used to copy a group of continuous bits (of designated length) from offset 0 of the source register to into the destination register with the designated offset. The BFGET instruction is often used to extract a bitfield from a register word, while BFSET is often used to set the value of a bitfield in a register word. According to an embodiment, both instructions complete within one cycle (e.g., no pipeline bubbles).

Sometimes firmware may need to perform more complicated bit manipulations that cannot be completed with a single BFSET/BFGET instruction. For example, one may wish to extract multiple bitfields from a register to compose a new data word of a different format. The bit field operation (BitOp) extension is designed for these situations.

The bit shuffle extension returns one 16-bit output for each ALU64 command. There are three inputs to the BitOp extension.

The first input is the 16-bit parameter of the ALU64 command, represented by the name rS. It is the first source register.

The second input is the 64-bit parameter of the ALU64 command, represented by the name xT. It is the second source register.

The third input, stored in RF64 (e.g., the registers 216), represents the actual bit field manipulation commands. According to an embodiment, each microprocessor 200 can support up to four pre-programmed commands. Each command is an array of 16 entries, with one entry corresponding to one bit in the output data. Each entry, in the format of BitOp, specifies how the value of the corresponding output bit is determined. There are four extension IDs defined for BitOp: F0A64_BitOp0~F0A64_BitOp3; the BitOp extension uses the extension ID to determine which BitOCmd in RF64_BITOP to use.

The bit shuffle extension contains an output queue of depth 4, so the microprocessor 200 can issue up to four outstanding ALU64 commands before popping the results back. There is a one-cycle bubble between the time an ALU64 command is received and the time the data is available via A64LD. The BitOp extension operation is fully pipelined; thus the one-cycle bubble between command push and result pop can be hidden by issuing more than one outstanding BitOp commands before popping back the results.

It is assumed that the BitOp commands in RF64_BITOP are already stable when the BitOp extension is invoked. In other words, RF64_BITOP should only be updated when the BitOp extension is idle.

The operation of the BitOp command is as follows. Step 1: Use the received extension ID to determine which command in RF64_BITOP to use for the bit field manipulations. TABLE 1 illustrates Step 1.

cmd = (extID==F0A64_BitOp0) ? RF64_BITOP.cmd0 :
       (extID==F0A64_BitOp1) ? RF64_BITOP.cmd1 :
       (extID==F0A64_BitOp2) ? RF64_BITOP.cmd2 :
       /* extID==F0A64_BitOp3)*/ RF64_BITOP.cmd3; // cmd is an array of 16 BitOps

TABLE 1

Step 2: Determine the value of each bit in the 16-bit output data. TABLE 2 provides pseudocode for performing Step 2.
    For (i=0; i<16; i++) {
      op = cmd[i]; // op is in the format of BitOp
      srcBit = op.src==rS ? rS : xT; // select the source register
      if (op.src==rS) {
        if (op.idx[5]==0) // copy with optional inversion
          output[i] = rS[op.idx[3:0]] ^ op.mode;
        else // set to zero or one
          output[i] = op.idx[4];
      } else { // op.src==xT
        output[i] = xT[op.idx] ^ op.mode;
      }
    }

TABLE 2

As can be seen from the operations detailed in TABLE 1 and TABLE 2, preconfigured bit manipulation patterns may be programmed into lookup tables that are implemented in hardware. The microprocessor 200 then executes commands to access the lookup tables and to perform operations according to the bit manipulation patterns. As a result, the microprocessor 200 can quickly select from the preprogrammed operations for the desired bit permutation result. In consequence, dedicated bit manipulation hardware may be avoided.

According to an embodiment of the present invention, an apparatus implements bit manipulations. The apparatus includes a memory and an ALU. The memory stores bit manipulation patterns. The ALU executes a first bit manipulation command that programs the bit manipulation patterns. The ALU executes a second bit manipulation command that manipulates a first set of bits (in the memory) into a second set of bits (in the memory) according to a selected one of the bit manipulation patterns. In this manner, a variety of bit manipulations may be implemented programmatically without the need for dedicated hardware.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for executing assembly language program code in a pipeline circuit, the method comprising:
   executing a branch instruction of the assembly language program code, wherein the branch instruction includes (i) a condition operand, (ii) a branch destination operand, and (iii) a program count operand, wherein
      the condition operand specifies a condition that must be met when the branch instruction is executed for a branch to occur,
      the branch destination operand specifies a destination instruction to fetch if the condition is met, and
      the program count operand specifies a program count that must be reached to fetch the destination instruction;
   wherein the executing of the branch instruction includes
      determining whether the condition is currently met, and
      in response to determining that the condition is currently met, storing the branch destination operand and the program count operand;
   determining whether a current program count matches the stored program count operand; and
   after determining that the condition was met when the branch instruction was executed, and in response to determining that the current program count matches the stored program count operand, fetching the destination instruction specified by the stored branch destination operand.

2. The method of claim 1, wherein the program count is in terms of instruction cycle.

3. The method of claim 1, wherein the program count is in terms of a step in an execution sequence of executing the program code.

4. The method of claim 1, wherein the branch destination operand specifies a line number of the destination instruction to be fetched, and wherein the line number is indicative of a memory location of the destination instruction to be fetched.

5. The method of claim 1, wherein the program count operand has a value equal to or greater than the time the branch instruction is fetched plus n, and wherein n equals a number of pipeline stages that the branch instruction progresses through, including a fetch stage and an execute stage.

6. The method of claim 1, wherein the pipeline circuit contains subsequent instructions that follow the branch instruction in the program code and that are in the pipeline circuit when the branch instruction is executed, and wherein the executing further includes:
   executing the subsequent instructions while the fetched destination instruction is incrementally moved to an execution stage.

7. The method of claim 6, wherein the subsequent instructions are not dependent on an outcome of a branch implemented by the branch instruction.

8. The method of claim 5, wherein the program count operand has a value greater than the program count the branch instruction is fetched plus n.

9. The method of claim 6, further including, after executing the branch instruction and before reaching the program count specified by the program count operand:
  fetching a further instruction that follows the branch instruction in the program code and that is not part of a branch routine pointed to by the branch destination operand.

10. The method of claim 1, wherein the pipeline circuit includes a fetch stage, a decode stage, and an execute stage.

11. A microprocessor comprising:
  a pipeline circuit configured to execute a branch instruction of an assembly language program code, wherein the branch instruction includes (i) a condition operand, (ii) a branch destination operand, and (iii) a program count operand, wherein
    the condition operand specifies a condition that must be met when the branch instruction is executed for a branch to occur,
    the branch destination operand specifies a destination instruction to fetch if the condition is met, and
    the program count operand specifies a program count that must be reached to fetch the destination instruction;
  wherein the pipeline circuit is configured to execute the branch instruction by
    determining whether the condition is currently met, and
    in response to determining that the condition is currently met, storing the branch destination operand and the program count operand; and
  wherein the pipeline circuit is configured to, after executing the branch instruction
    determine whether a current program count matches the stored program count operand;
    after determining that the condition was met when the branch instruction was executed, and in response to determining that the current program count matches the stored program count operand, fetch the destination instruction specified by the stored branch destination operand.

12. The microprocessor of claim 11, wherein the program count is in terms of instruction cycle.

13. The microprocessor of claim 11, wherein the program count is in terms of a step in an execution sequence of executing the program code.

14. The microprocessor of claim 11, wherein the branch destination operand specifies a line number of the destination to be fetched, and wherein the line number is indicative of a memory location of the destination instruction to be fetched.

15. The microprocessor of claim 11, wherein the program count operand has a value equal to or greater than the time the branch instruction is fetched plus n, and wherein n equals a number of pipeline stages that the branch instruction progresses through, including a fetch stage and an execute stage.

16. The microprocessor of claim 11, wherein, in a situation where the pipeline circuit contains subsequent instructions that follow the branch instruction in the program code and that are in the pipeline circuit when the branch instruction is executed, the pipeline circuit is configured to:
  execute the subsequent instructions while the fetched destination instruction is incrementally moved to an execution stage.

17. The microprocessor of claim 16, wherein the subsequent instructions are not dependent on an outcome of a branch implemented by the branch instruction.

18. The microprocessor of claim 15, wherein the program count operand has a value greater than the program count the branch instruction is fetched plus n.

19. The microprocessor of claim 16, wherein the pipeline circuit is further configured to, after executing the branch instruction and before reaching the program count specified by the program count operand:
  fetch a further instruction that follows the branch instruction in the program code and that is not part of a branch routine pointed to by the branch destination operand.

20. A computer-readable medium tangibly encoded with assembly language program code, the program code comprising:
  a branch instruction of the assembly language program code, wherein the branch instruction includes (i) a condition operand, (ii) a branch destination operand, and (iii) a program count operand, wherein
    the condition operand specifies a condition that must be met when the branch instruction is executed for a branch to occur,
    the branch destination operand specifies a destination instruction to fetch if the condition is met, and
    the program count operand specifies a program count that must be reached to fetch the destination instruction;
  wherein the branch instruction is configured to be executed by
    determining whether the condition is currently met, and
    in response to determining that the condition is currently met, storing the branch destination operand and the program count operand; and
  wherein the executing of the branch instruction is followed by
    determining whether a current program count matches the stored program count operand;
    after determining that the condition is was met when the branch instruction was executed, and in response to determining that the current program count matches the stored program count operand, fetching the destination instruction specified by the stored branch destination operand.

* * * * *